(12) United States Patent
Edwards et al.

(10) Patent No.: US 6,457,878 B2
(45) Date of Patent: Oct. 1, 2002

(54) MULTIPLE FIBER SPLICE ELEMENT AND CONNECTOR

(75) Inventors: Bryan Edwards, Camp Hill; Kenneth Hall, Lafayette Hill; Robert Briggs, Newport; Shelly Buchter, East Berlin; Craig Kegerise, Middletown, all of PA (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/851,632

(22) Filed: May 9, 2001

Related U.S. Application Data

(63) Continuation of application No. 09/183,983, filed on Nov. 2, 1998, now Pat. No. 6,247,850.
(60) Provisional application No. 60/065,295, filed on Nov. 13, 1997.

(51) Int. Cl.[7] .............................................. G02B 6/255
(52) U.S. Cl. ....................................................... 385/96
(58) Field of Search ............................... 385/96–99, 54, 385/55, 56

(56) References Cited

U.S. PATENT DOCUMENTS

| | | | | |
|---|---|---|---|---|
| 4,645,295 A | * | 2/1987 | Pronovost | .................. 350/96.2 |
| 4,743,084 A | * | 5/1988 | Manning | .................. 350/96.21 |
| 5,121,456 A | * | 6/1992 | Essert et al. | .................. 385/70 |
| 5,134,678 A | * | 7/1992 | Essert | .......................... 385/86 |
| 5,216,736 A | * | 6/1993 | Essert | .......................... 385/96 |
| 5,367,594 A | * | 11/1994 | Essert et al. | .................. 385/70 |
| 5,367,595 A | * | 11/1994 | Jennings et al. | ............... 385/71 |
| 5,392,373 A | * | 2/1995 | Essert | .......................... 385/92 |
| 5,440,657 A | * | 8/1995 | Essert | .......................... 385/59 |
| 5,450,517 A | * | 9/1995 | Essert | ........................ 385/134 |
| 5,734,775 A | * | 3/1998 | Vidacovich et al. | ........ 385/134 |

FOREIGN PATENT DOCUMENTS

| | | | |
|---|---|---|---|
| DE | 197 14 715 A1 | * | 10/1998 |
| EP | 0800100 A1 | * | 8/1997 |

* cited by examiner

Primary Examiner—Michael P. Stafira

(57) ABSTRACT

A duplex fiber optic splice has a fiber-receiving element, two clamping elements covering opposite faces of the fiber-receiving element, and a spring element. A bearing key may be inserted into a bearing channel in the fiber-receiving element and rotated resulting in resilient disengagement of each of said clamping faces from said fiber-receiving element face. The resilient disengagement of the clamping elements are independent of each other. The splice assembly may be used alone or in conjunction with an array ferrule, pre-terminated with a fiber stub, and a housing to provide an adhesiveless field terminable connector.

15 Claims, 13 Drawing Sheets

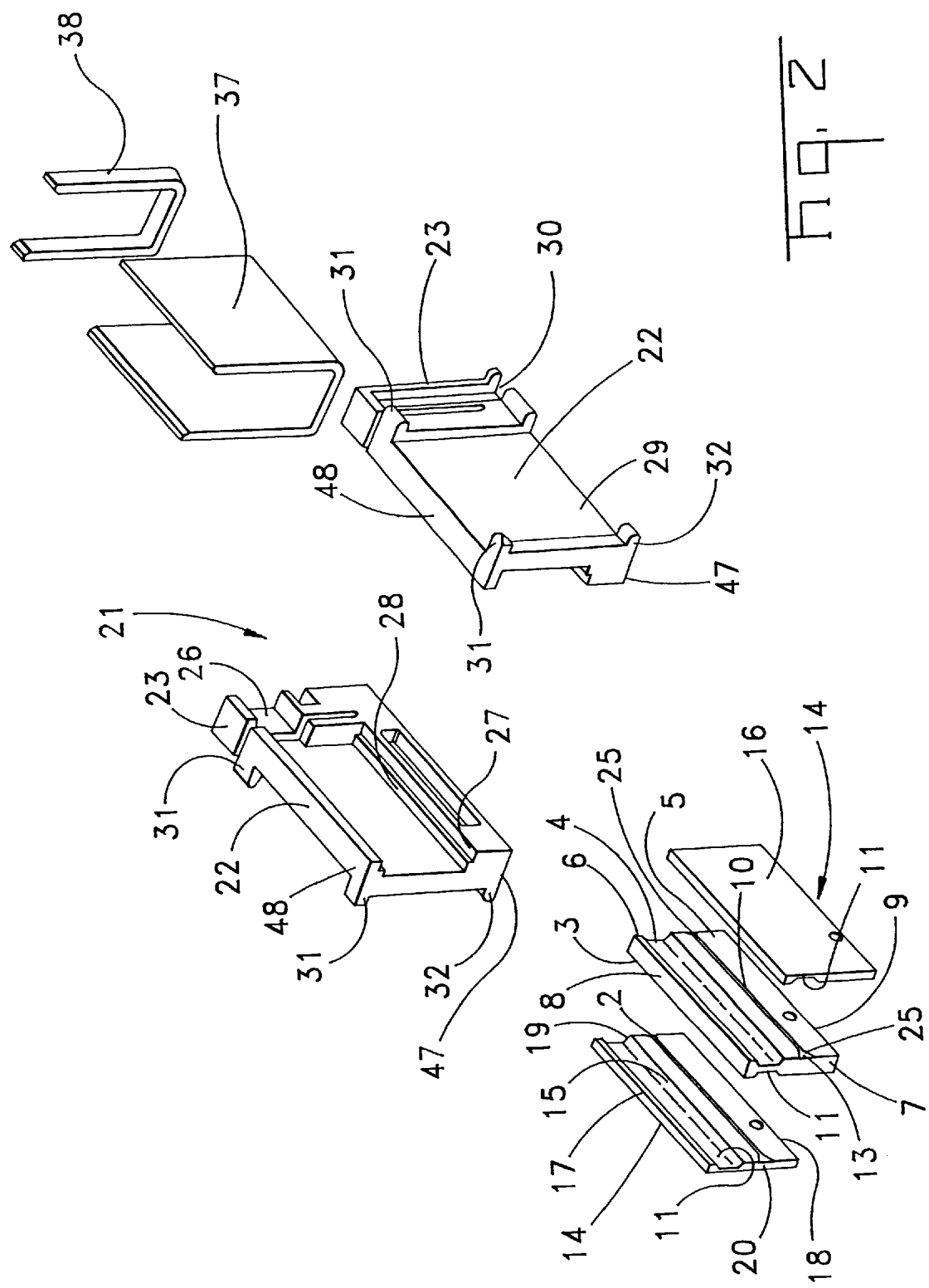

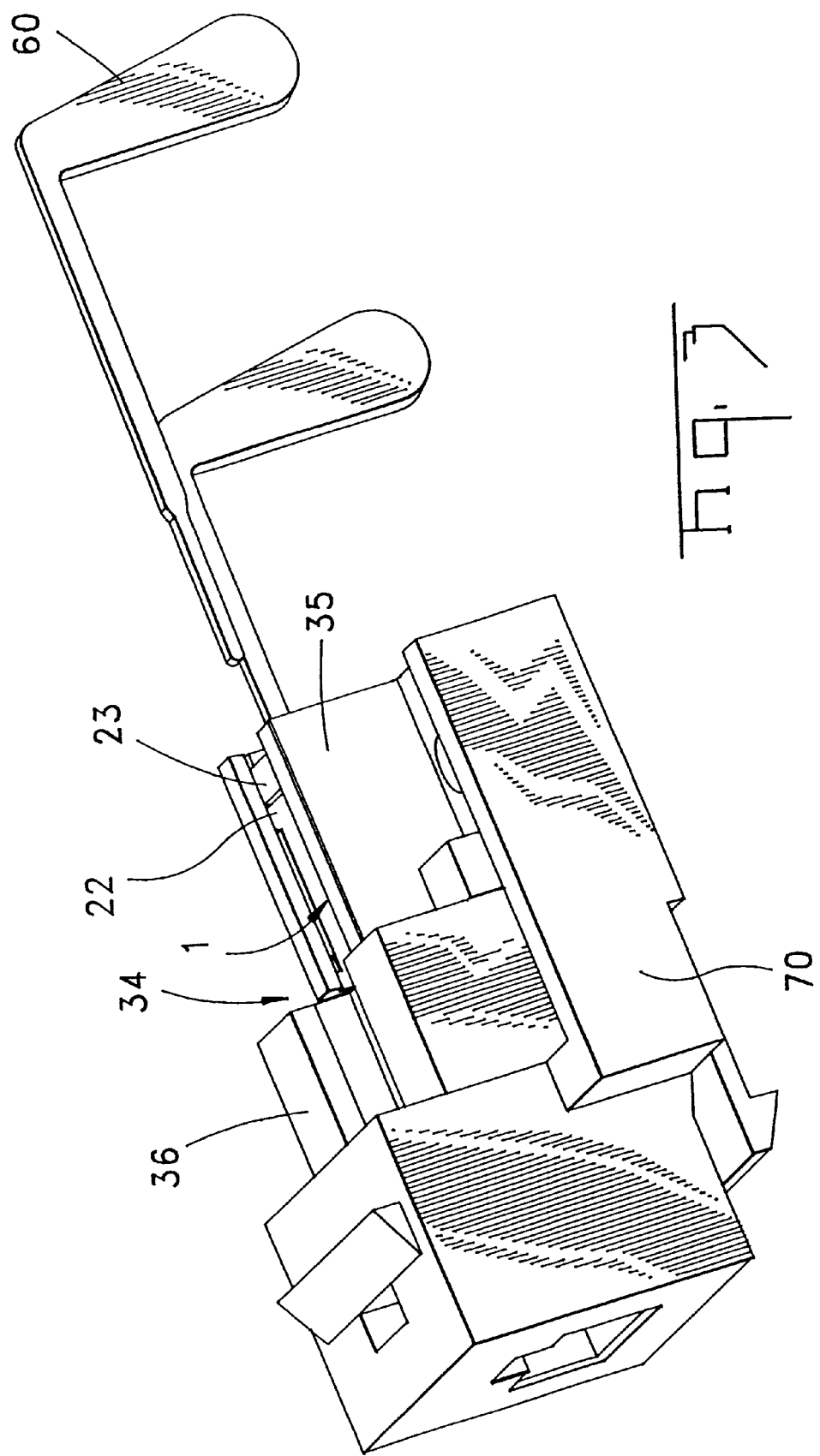

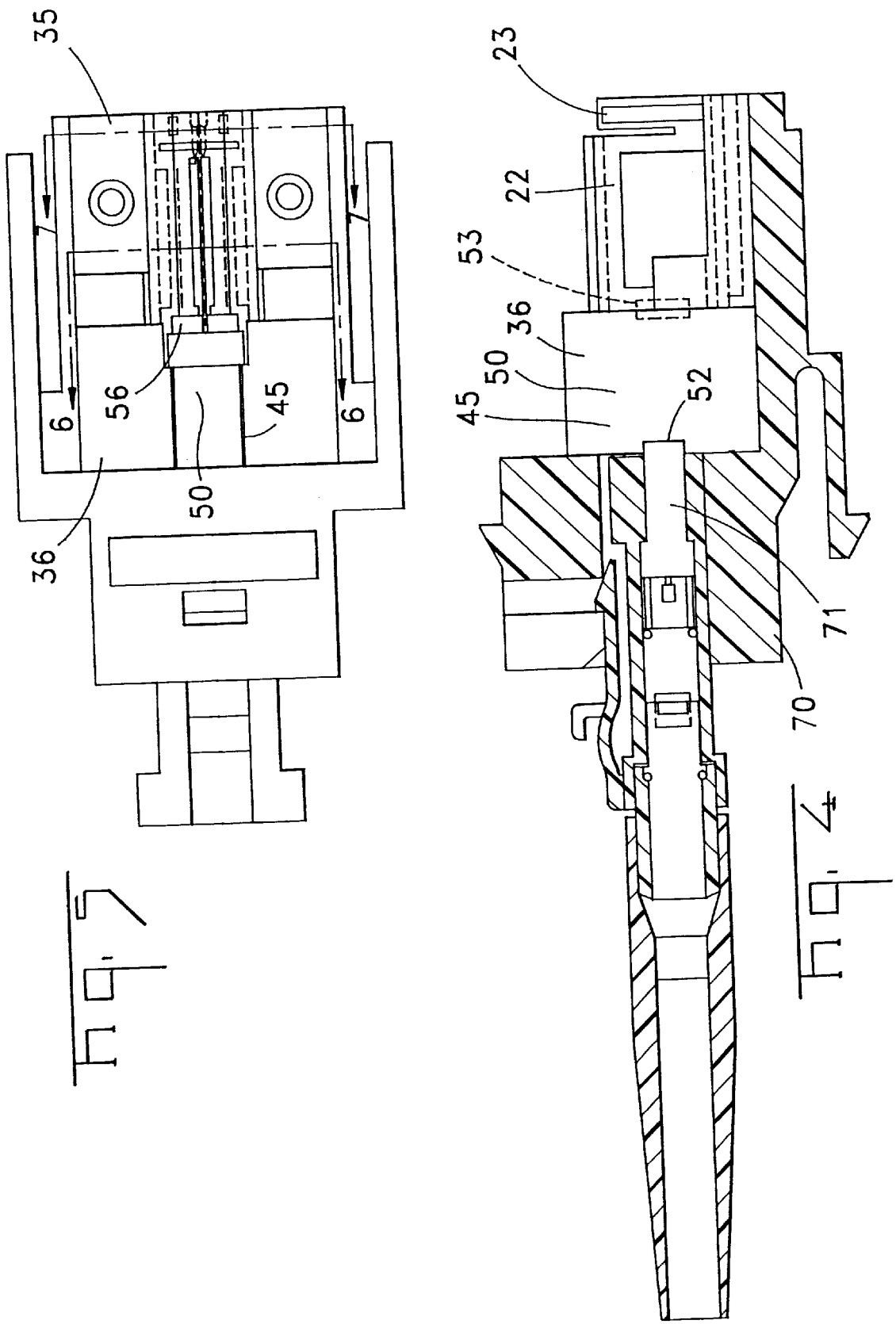

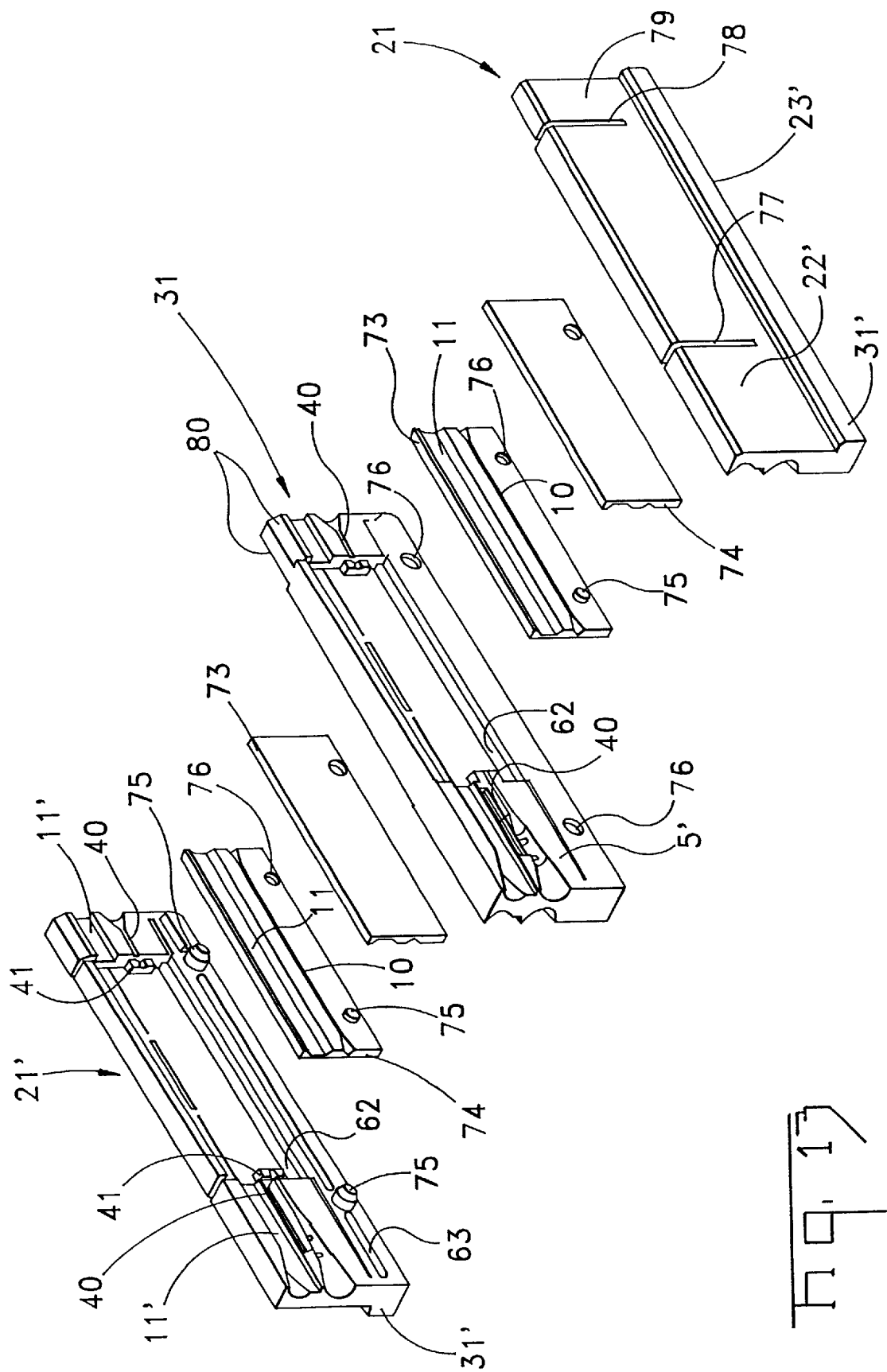

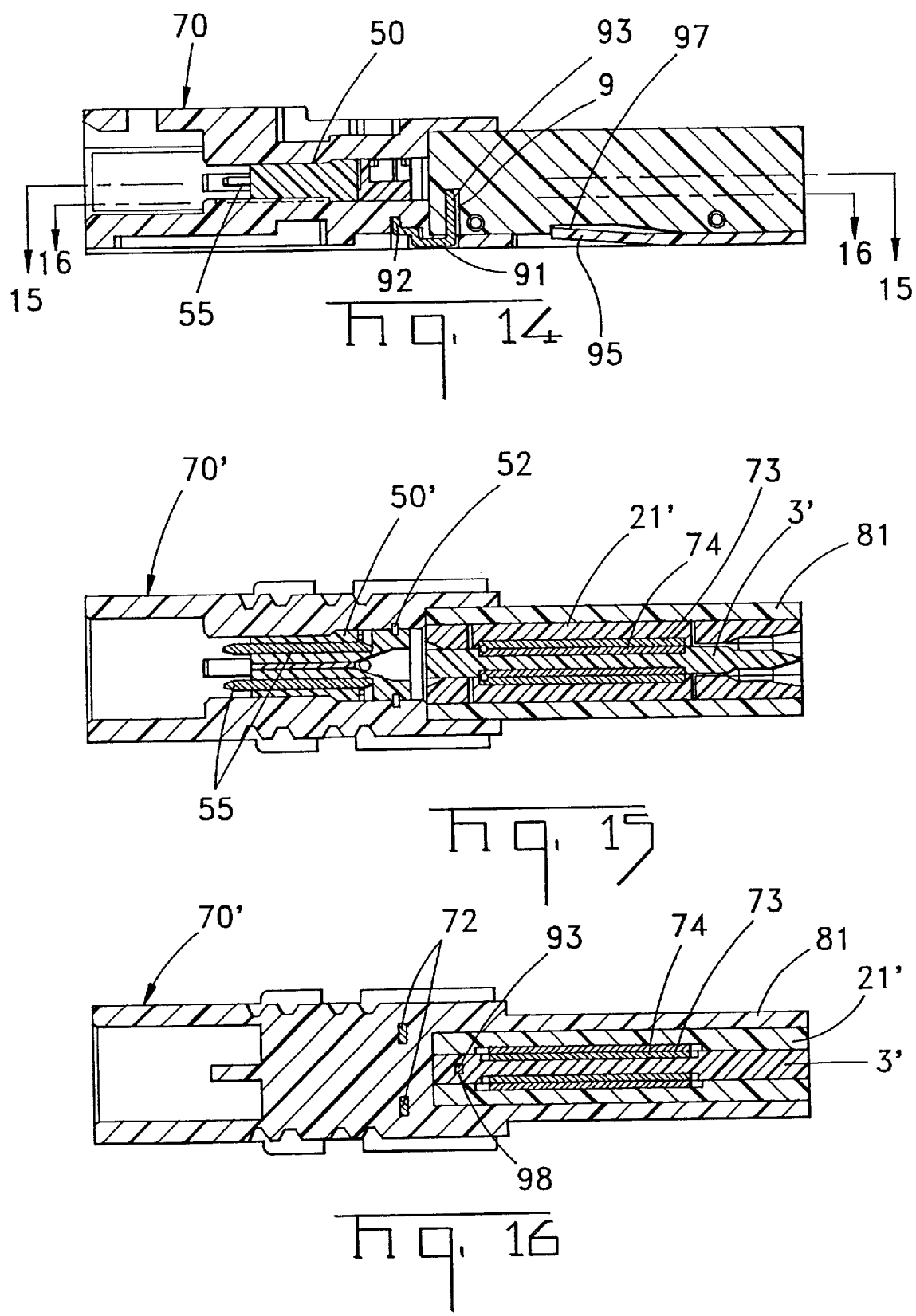

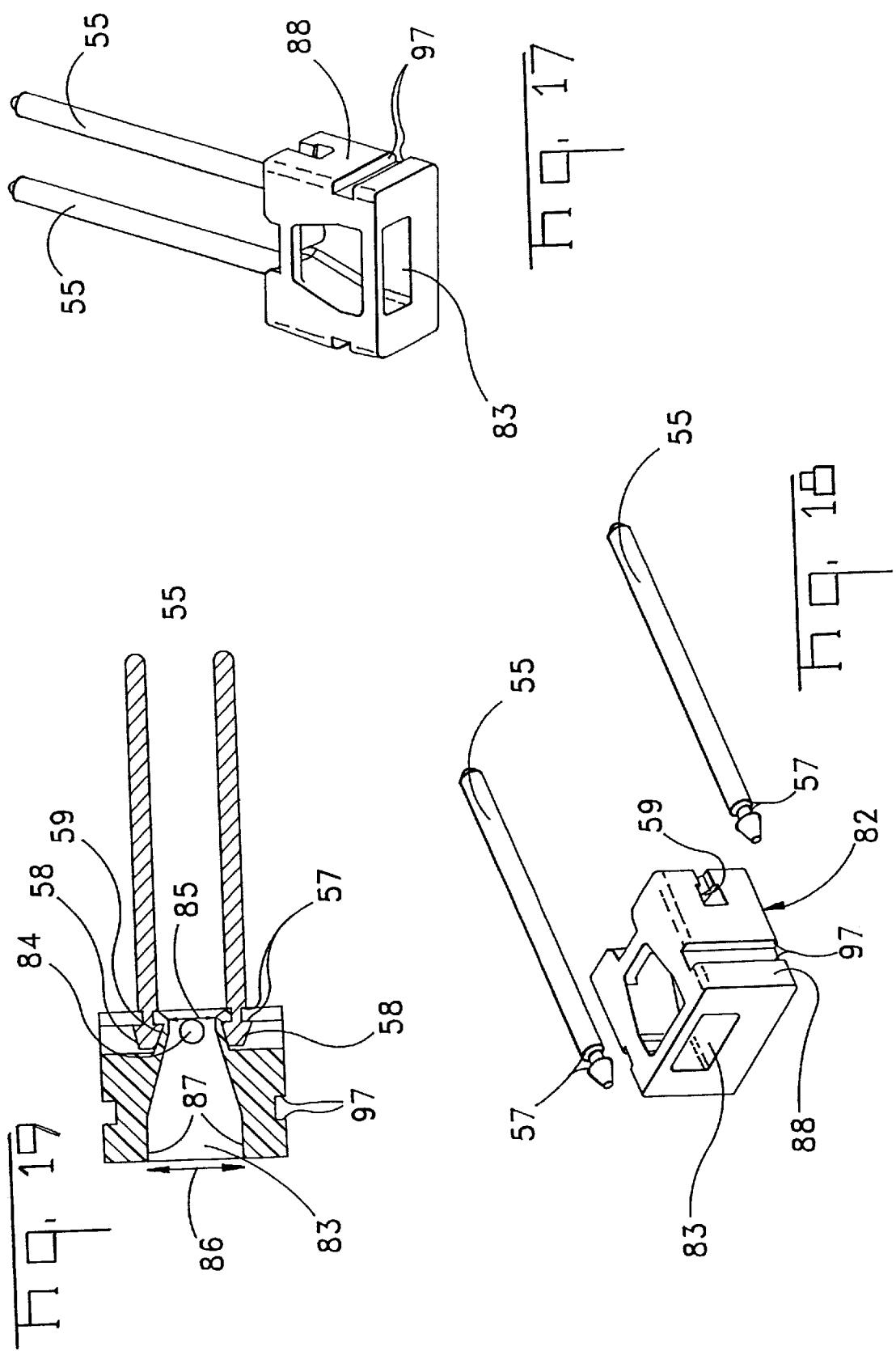

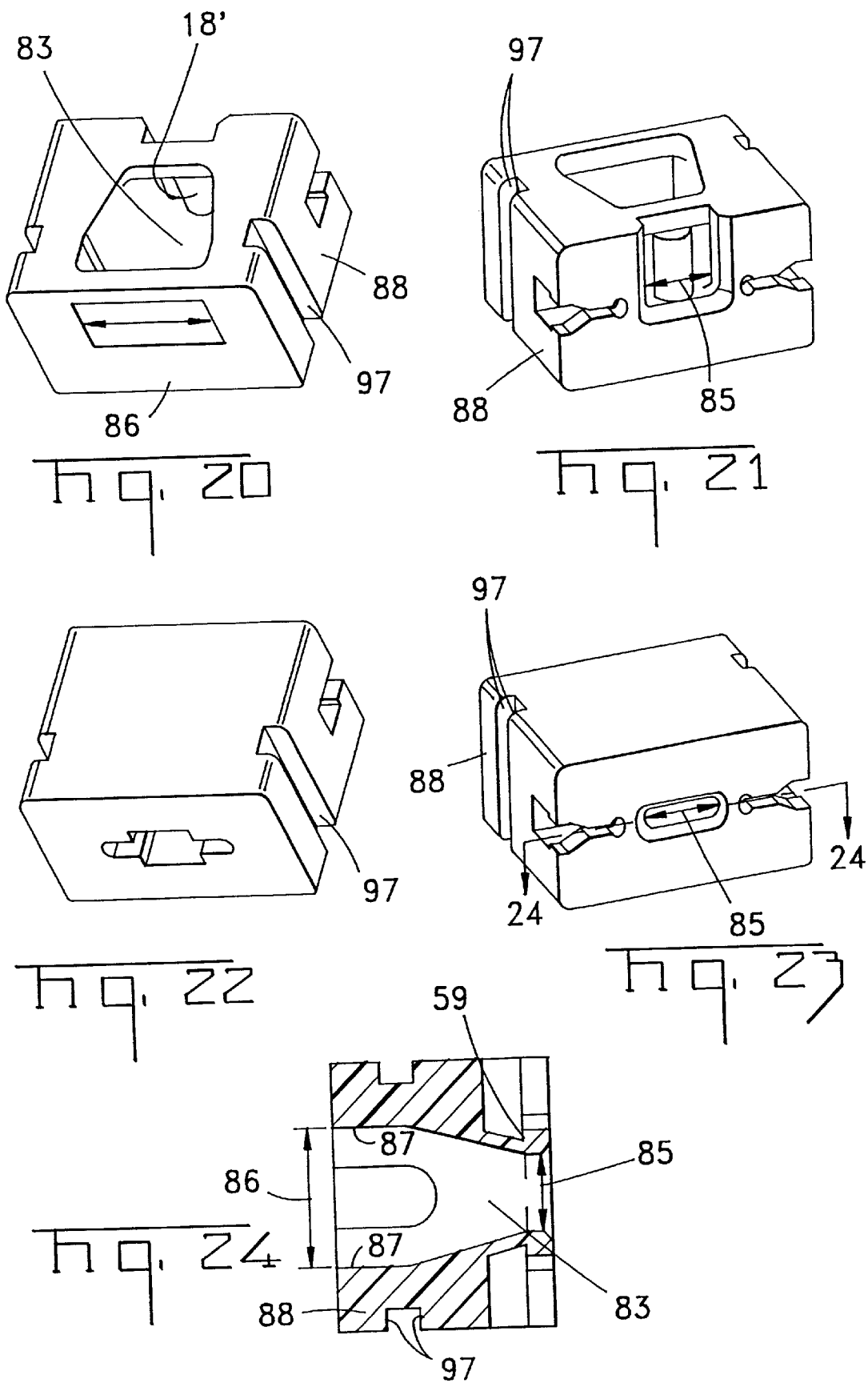

MULTIPLE FIBER SPLICE ELEMENT AND CONNECTOR

This application is a continuation of Ser. No. 09/183,983 filed Nov. 2, 1998 now U.S. Pat. No. 6,247,850 which claims benefit of No. 60/065,295 filed Nov. 13, 1997.

FIELD OF THE INVENTION

The present invention relates to re-enterable splicers and more particularly to re-enterable splicers for use in terminating to a separable interface that accommodates multiple fibers.

BACKGROUND OF THE INVENTION

A re-enterable fiber optic splice having complementary clam-shell halves joined on one side is known. An example of such a splice is disclosed in U.S. Pat. No. 5,121,456 in which the two complementary halves have a fiber-receiving channel for retaining a fiber and an aperture into which a tool may be inserted. The complementary halves function as a double cantilever spring clamp to hold the fiber in the fiber-receiving channel. The double cantilever spring permits installation of the fiber when the tool inserted in the aperture is used to overcome the clamping force of the spring clamps to slightly enlarge the diameter of the fiber-receiving channel. A re-enterable fiber optic splice for a dual fiber and multiple fiber ribbon using a similar tool for fiber installation is also known from U.S. Pat. Nos. 5,440,657 and 5,450,517.

The duplex fiber optic splice finds applications in the data communications area for premise wiring and fiber to the desk. For each communications device, for example a computer, there is one fiber for incoming data transfer and one fiber for outgoing data transfer. As users have come to expect, when networking a communications device, one plugs into a mating wall outlet or patch panel, a connector attached to a cable coming from the computer. The duplex configuration, therefore, is a logical grouping for a single reusable connection to a data communications device. Advantageously, known duplex fiber optic splices provide a re-enterable fiber optic termination with acceptable interconnection performance. Disadvantageously, the splices may be awkward to terminate because the fibers are not independently actuated. There is a need, therefore, for independently actuated fibers in a duplex splice.

As most buildings currently have copper based wiring and existing wall outlets and patch panels, it is desirable that a fiber optic termination device permit retrofitting of existing copper based connectors with fiber optic connectors. It is further desirable that installations require a minimum of time, effort, and likelihood of installation error. In order to address some of these needs, there is known a splice element having a mating connector at one end and the splicing termination at the other. Such a splicer-connector is disclosed in U.S. Pat. No. 5,367,594 for a simplex or single fiber connection in which a fiber stub is terminated in a ferrule. The ferrule is operatively associated with a coupling member capable of separable interconnection with a mating connector. The fiber stub is received within the splice assembly for splicing to a bare fiber. Advantageously, the splicer-connector that is disclosed in the '594 patent produces an optical fiber apparatus having a separable interface, wherein the optical fiber apparatus can be mechanically terminated in the field by a cleaved and unpolished fiber. The disclosed splicer-connector accommodates a single fiber providing a separable interconnection with a single filter ferrule. There remains a need, however, for a mechanically terminated optical fiber connector that provides a separable interconnection with a fiber array ferrule.

SUMMARY OF THE INVENTION

It is an object of a fiber optic connector according to the teachings of the present invention that a mechanically terminated separable interconnection can be made to a fiber array ferrule.

It is an object of a fiber optic splice according to the teachings of the present invention that a fiber optic connector has a matable interface and can be installed with a minimum amount of time and effort and likelihood of error.

A fiber optic splice element comprises a fiber-receiving element having opposite faces, first and second ends, and first and second sides. Each face has at least one elongate fiber channel extending from the first end to the second end. Each face also has an elongate bearing channel extending from the first side. The splice element also comprises a clamping element having a clamping face and a spring face opposite each other and first and second sides. The clamping element covers at least a portion of each elongate channel. The splice further comprises a splice spring for imparting opposing normal forces on the spring faces of the clamping elements and along the first side of the fiber-receiving element. The spring permits independent resilient disengagement of each clamping face from the fiber-receiving element face.

It is a feature of a fiber optic splice according to the teachings of the present invention that a multiple fiber splice has independent fiber actuation.

It is an advantage of a splice according to the teachings of the present invention that a duplex configuration has independently actuated fibers.

BRIEF DESCRIPTION OF THE DRAWINGS

Embodiments of the invention will now be described by way of example and with reference to the accompanying drawings in which:

FIG. 2 is a disassembled perspective view of a fiber optic splice assembly according to the teachings of the present invention.

FIG. 3 is an assembled perspective view of a fiber optic duplex splice and connector according to the teachings of the present invention.

FIG. 4 is a longitudinal cross sectional view of a fiber optic duplex splice and connector according to the teachings of the present invention shown with a mating connector and a splice assembly shown in phantom view.

FIG. 5 is a plan cross sectional view of a fiber optic splice and connector according to the teachings of the present invention.

FIG. 13 is a disassembled perspective view of the splice sub-assembly shown in FIG. 11 according to the teachings of the present invention.

FIG. 14 is a cross sectional view of the fiber optic connector shown in FIG. 11.

FIGS. 15 and 16 are cross sectional views of the fiber optic connector shown in FIG. 11 taken along planes 15—15 and 16—16 respectively shown in FIG. 14.

FIGS. 17–21 are perspective, perspective disassembled, and cross sectional views respectively of a pin keeper according to the teachings of the present invention.

FIGS. 22–24 are perspective views of a second embodiment of a pin keeper according to the teachings of the present invention.

DETAILED DESCRIPTION OF EMBODIMENTS OF THE INVENTION

Figure 1:
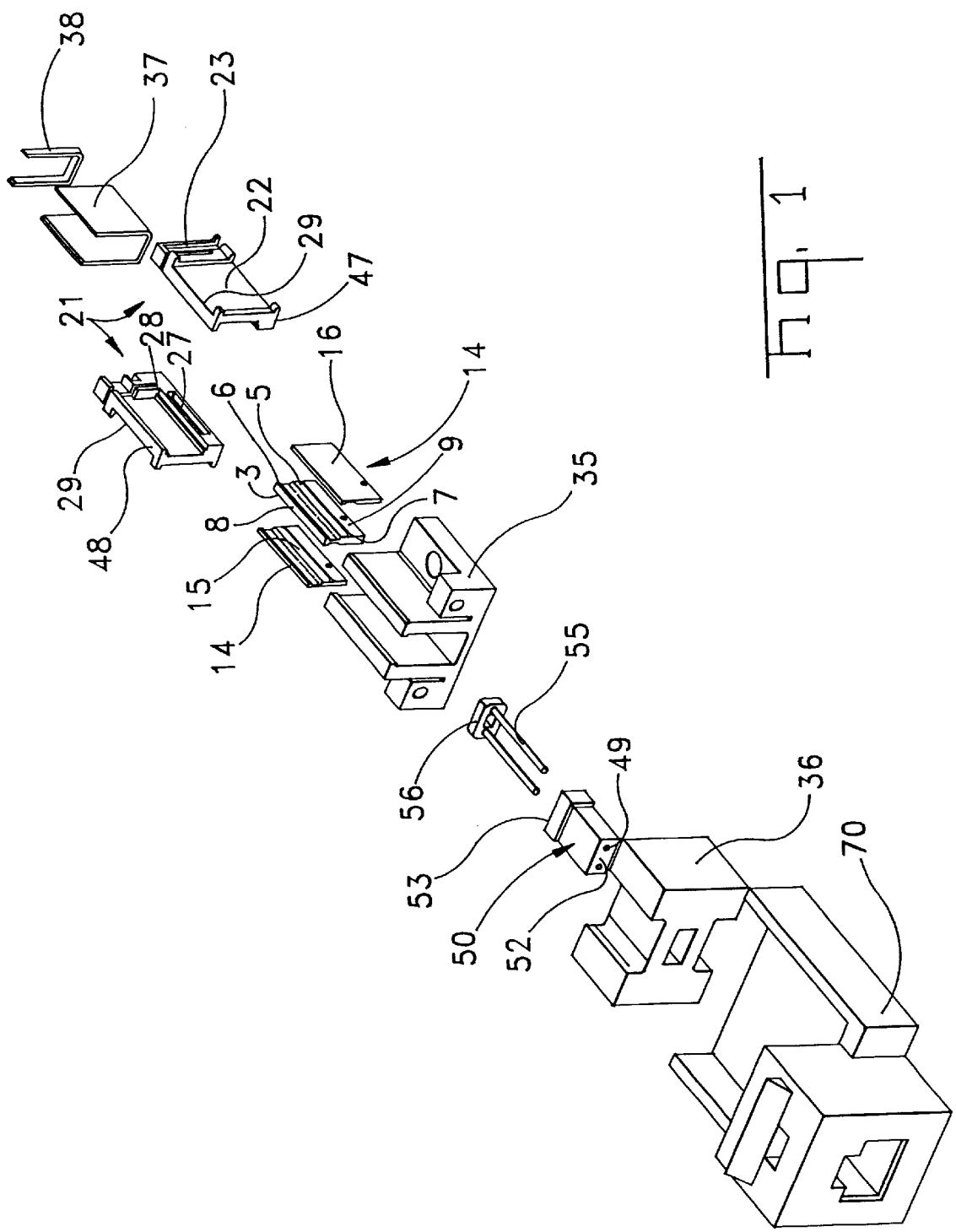
FIG. 1 is a disassembled perspective view of a fiber optic splice and connector according to the teachings of the present invention.
Figures 6, 7:
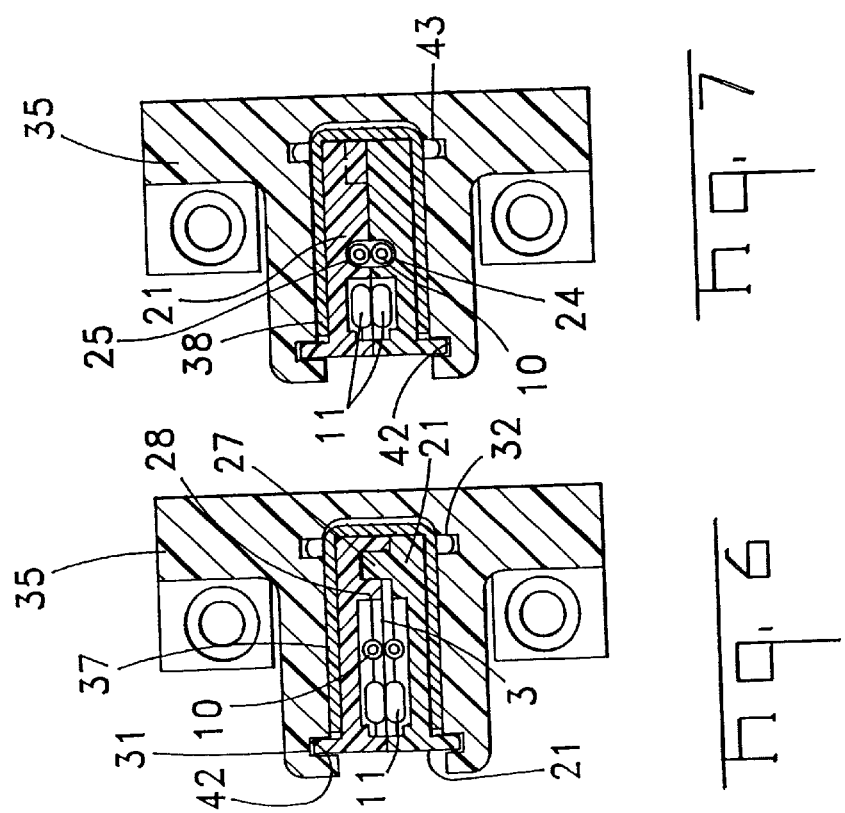
FIG. 6 is a cross sectional view of a fiber optic splice and connector according to the teachings of the present invention as taken along the lines 6—6 of FIG. 5.
FIG. 7 is a cross sectional view of a fiber optic splice and connector according to the teachings of the present invention as taken along the lines 7—7 of FIG. 5.

With specific reference to FIGS. 1 and 2 of the drawings, there is shown parts of a splice assembly 1 according to the teachings of a first embodiment of the present invention that is particularly well suited for installation into a wall mount. The splice assemblies disclosed receive an optical fiber (not shown) that is stripped to expose either a 900 micron buffered portion, a 250 micron coated portion, and 125 micron bare fiber or the 250 micron portion and the 125 micron bare fiber. The splice assembly 1 comprises a generally planar, rectangular fiber-receiving element 3 having two planar faces 5 opposite each other, first and second ends 6,7, and first and second sides 8,9. Each face 5 has an elongate fiber channel 10 comprising a V-groove extending the entire length of the planar face 5 from the first end 6 to the second end 7. The V-groove at each of the first and second ends 6,7 widens to create a lead-in 40 to aid threaded installation of the fibers to be installed in the fiber channel 10 from an axial direction. Each face 5 also has a semi-rectangular elongate bearing channel 11 extending the entire length of the planar face 5 from said first end 6 to said second end 7 of the fiber-receiving element 3. The elongate bearing channel 11 creates an actuation entrance 4 on the first and second ends 6,7. The splice assembly 1 further comprises a generally planar, rectangular clamping element 14 having a clamping face 15 and a spring face 16 and first and second sides 17,18 respectively. As shown in FIG. 2 of the drawings, the clamping face 15 and the spring face 16 are opposite each other. The clamping face 15 of the clamping element 14 is positioned against each face 5 of the fiber-receiving element 3 and covers the elongate fiber channel 10 as well as the elongate bearing channel 11. The fiber-receiving element 3 and two clamping elements 14 are positioned adjacent each other and aligned along the first sides 8,17 of both the fiber-receiving element 3 and the clamping elements 14. The fiber-receiving channel 10 together with the clamping face 15, which also includes a V-groove fiber channel, provides an enclosed space having four points of contact to the installed fiber. The four points of contact provide for accurate alignment of a core of the fiber and positive retention of the fiber along the length of the fiber-receiving element 3. Alternatively, the clamping face 15 of the clamping element 14 may be planar opposite the fiber channel 10 to provide three points of contact to the installed fiber. The clamping element 14 also provides an enclosed space for the bearing channel 11. A bearing key 60,61, having a generally complementary rectangular cross section is inserted into the bearing channel 11 for installation and removal of the fiber in the fiber channel 10. The first and second sides 8,9 of the fiber-receiving element 3 are longer than the first and second sides 17,18 of the clamping elements 14. The first and second ends 6,7 of the fiber-receiving element 3 are longer in length than the first and second ends 19,20 as shown in FIG. 6 of the drawings.

The fiber optic splice assembly 1 further comprises a holding block 21 captivating the fiber-receiving element 3 and the clamping elements 14 and retaining them in a fixed side by side relative disposition. The holding block 21 comprises two complementary interlocking holding block halves for ease of assembly and positioning about the fiber-receiving element 3 and the clamping elements 14. The holding block 21 interlocks along a first side of the holding block 21 and is open along a second side of the holding block. The holding block 21 further comprises a first portion 22 having a fiber-receiving element shelf 27 and a clamping element shelf 28. The first side 8 of the fiber-receiving element 3 rests against the fiber-receiving shelf 27 which serves to retain and position the fiber-receiving element 3 within the holding block 21. The first side 17 of each clamping element 14 rests against each clamping element shelf 28 which serves to retain and position the clamping elements 14 relative to the fiber-receiving element 3 and the holding block 21. A first portion 22 of the holding block 21 further comprises an external spring recess 29. A generally U-shaped metal splice spring 37 is positioned in the spring recess 29. The enclosed portion of the splice spring 37 is positioned along a first side 47 of the holding block 21. The splice spring 37 provides opposing normal forces toward a spring face 16 of the clamping elements 14 along the length of the first sides 8,17 of the fiber-receiving element 3 and the clamping elements 14. By virtue of the non-opening first side 47 of the holding block 21 and opening second side 48 of the holding block, the holding block 21 and splice spring 37 creates a double cantilever structure. A similar double cantilever structure is disclosed in U.S. Pat. No. 5,121,456 the teachings of which are specifically incorporated by reference herein. The open portion of the splice spring 37 permits independent resilient disengagement of each of the clamping faces 15 from respective fiber-receiving element faces 5 upon insertion and rotation of the bearing key 60 or 61 in each of the bearing channels 11. The holding block 21 further comprises a second portion 23 having a second spring recess 30 for positioning a generally U-shaped metal second spring 38. The first portion 22 is integral, but partially isolated from the second portion 23 by an isolation slot parallel to the first end 6 that extends from the second side 48 of the holding block 21 to a position short of the first side 47 of the holding block. The second portion 23 of the holding block 21 further comprises a buffer clamping element 24. In a duplex embodiment, the buffer clamping element 24 comprises an aperture sized to receive and grip two 900 micron diameter buffered fibers as shown in FIG. 7 of the drawings. The buffer clamping element 24 is aligned with the fiber channel lead-in 25 in the first portion 22. The buffer clamping element 24, the fiber channel lead-in 25, and the fiber channel 10 are coaxial with each other. The second portion 23 of the holding block 21 further comprises an actuation aperture 26 access aligned with the actuation aperture in the first end 6 of the fiber-receiving element 3.

Assembly of the splice assembly comprises the steps of aligning the clamping elements 14 against each face 5 of the fiber-receiving element 3. In the disclosed embodiment, the fiber-receiving element 3 is a single piece with identical opposite faces 5, each face 5 including a fiber channel 10 and a bearing channel 11. An alternate embodiment includes two pieces, each piece having a flat face and a face with the fiber channel 10 and bearing channel 11 placed adjacent each other to create the fiber-receiving element 3. Another alternate embodiment includes a fiber-receiving element with more than one fiber channel 10 thereon to accommodate additional fibers. After the clamping elements 14 are positioned against the fiber-receiving elements 3 they are pinned together along the first side 8,17. Two interlocking halves of the holding block 21 are positioned to enclose the fiber-receiving element 3 and clamping elements 14, the fiber-receiving element 3 resting on the fiber-receiving element shelf 27 and each clamping element 14 resting on the clamping element shelves 28, and snapped into position. The splice spring 37 is positioned over the splice spring recess 29 in the first portion 22 of the holding block 21 and the second spring 38 is positioned over the second spring recess 30 in the second portion 23 of the holding block 21. This completes a splice assembly according to the teachings of the present invention.

Figure 9:
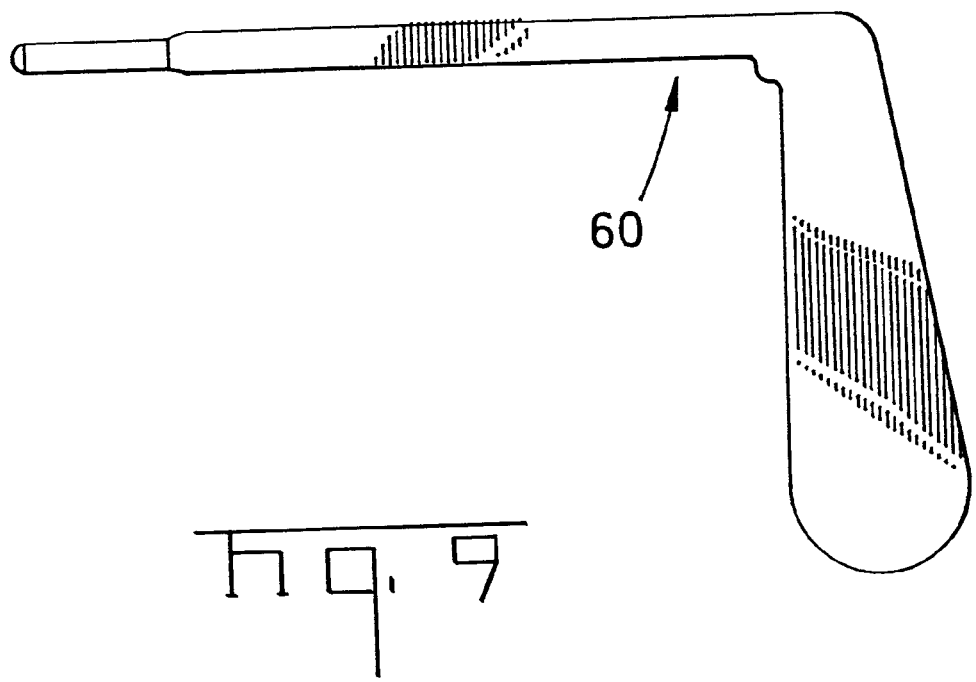
FIG. 9 is a plan view of a partial bearing key for use with a splice and connector according to the teachings of the present invention.
Figure 10:
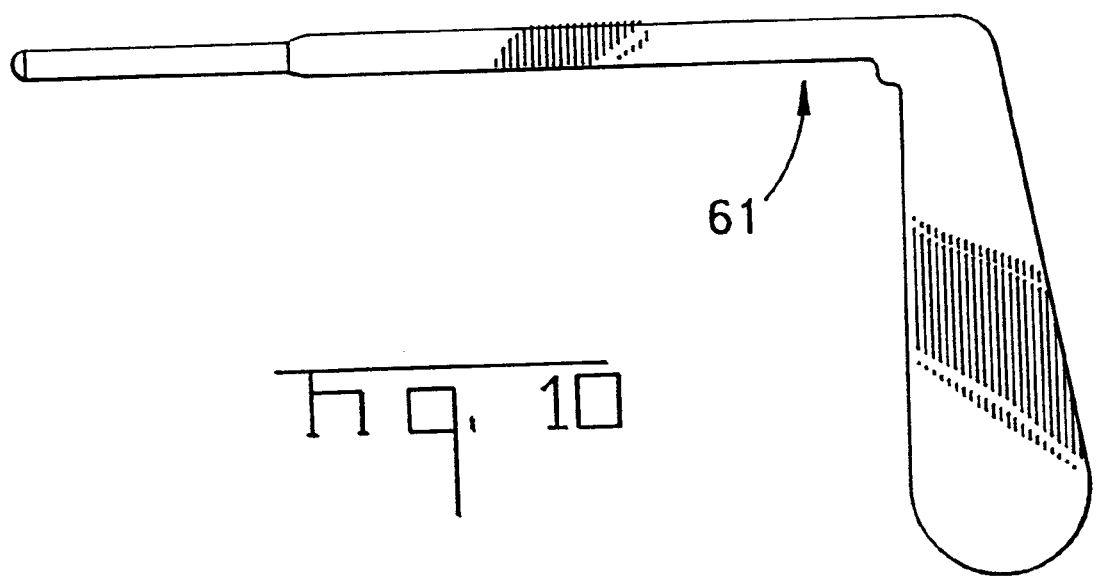
FIG. 10 is a plan view of a full bearing key for use with a splice and connector according to the teachings of the present invention.

Installation of two mating fibers (or a fiber and a fiber stub) in the splice is performed by use of one of the bearing keys 60,61 which is inserted into the bearing channel 11 through the actuation aperture and rotated 90 degrees. The rectangular cross section of the bearing key 60,61 causes a slight resilient disengagement of the clamping element 14 from the fiber-receiving element 3 upon rotation of the key. The disengagement is sufficient to insert and freely position the fiber in the fiber channel 10. Due to the longer length of the first and second ends 6,7 of the fiber-receiving element 3 as compared to the first and second ends 19,20 of the clamping elements 14, when the bearing key 60,61 is rotated, the disengagement of the clamping element 14 is caused by movement of the clamping element 14 only. The fiber-receiving element 3 remains stationary assuring the constancy of the fiber to fiber centerline spacing along the length of the fiber-receiving element 3. Upon appropriate placement of the fiber in the splice, the bearing key 60,61 is rotated 90 degrees to the starting position. Due to the resiliency of the splice assembly, the clamping element 14 returns to its original engaged position upon rotation of the bearing key 60,61 to actuate the fiber in the splice assembly 1. In a first embodiment, two mating fibers are installed at either end 6,7 of the splice using the bearing key 60,61 inserted into each end to disengage the clamping element 14 at each end 6,7. As disclosed, two different bearing keys 60,61 may be used. A full bearing key 60, as shown in FIG. 10 of the drawings, having a length at least as long as the length of the fiber-receiving element 3 may be inserted into the bearing channel 11 and used to open the entire fiber channel 10. When the fiber channel 10 is open using the full bearing key 60, a second fiber may be inserted into the second end 7 even though the full bearing key 60 is inserted into the first end 6 only. A partial bearing key 61, as shown in FIG. 9 of the drawings, having a length of approximately half of the length of the bearing channel 11 is used to open the portion of the fiber channel 10, permitting a first fiber to be inserted into the first end 6 while the second fiber remains stationary.

Figure 8:
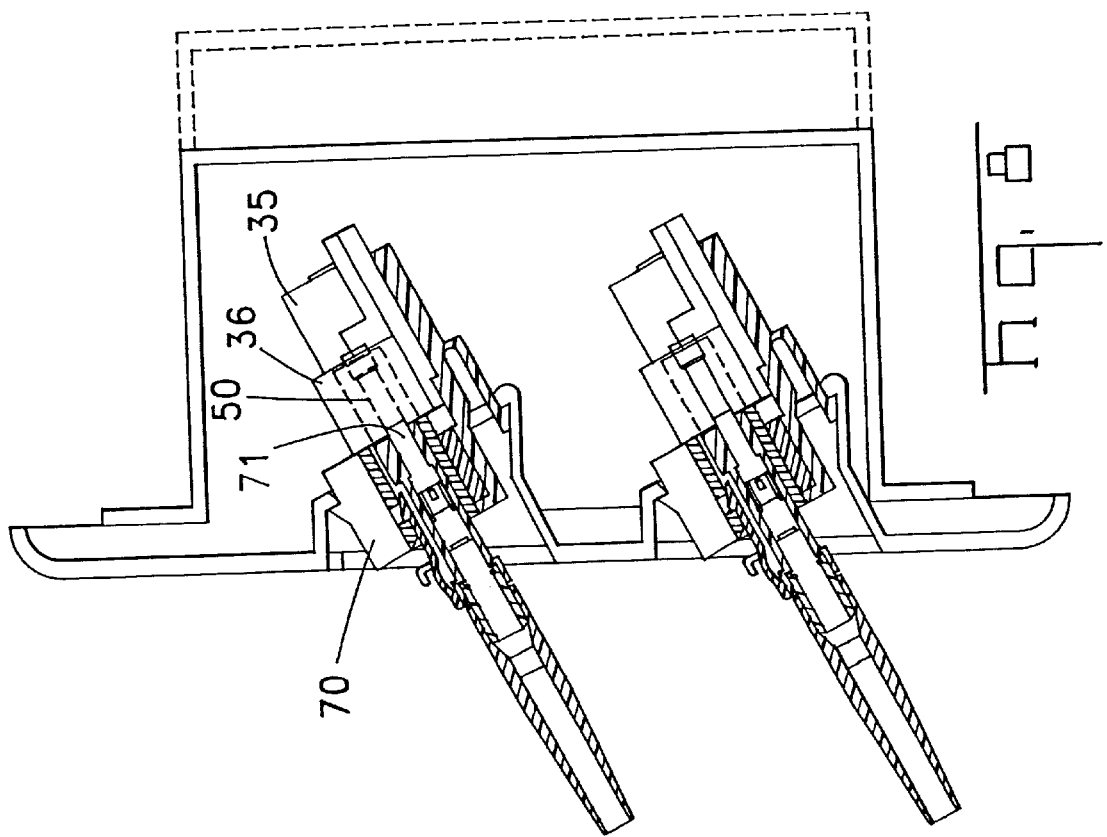
FIG. 8 is a cross sectional view of a fiber optic splice and connector according to the teachings of the present invention as installed in a wall outlet.

The splice assembly thus described finds use as a splice in a field terminable connector assembly. A connector assembly according to the teachings of the present invention further comprises housing 34, an array ferrule 50, and a connector housing 70. With specific reference to FIGS. 3,4 and 5 of the drawings, there is shown the housing 34, which comprises a splice housing 35 and a ferrule alignment housing 36. The housing 34 is disclosed as a two piece part, but the housing 34 may be a single unitary piece or include additional multiple pieces, the mechanical details of which are within the capability of one of ordinary skill in the art. The splice housing 35 holds the splice assembly 1. The holding block 21 of the splice assembly 1 comprises first and second alignment rails 31,32 protruding from the holding block 21 in a direction perpendicular to the fiber channel 10. The splice housing 35 has corresponding first and second alignment channels 42,43 to receive the first and second alignment rails 31,32 to retain the splice assembly 1 in the splice housing 35. The splice housing 35 has two sets of screw holes for attachment of the splice housing 35 to the ferrule alignment housing 36 and connector housing 70. The ferrule alignment housing 36 comprises a portion to which the splice housing 35 is attached and a ferrule alignment channel 45. The ferrule alignment channel 45 is sized to receive a mini-MT duplex fiber array ferrule 50 having two bores (not shown) for receiving and holding two fibers, a mating face 52, and a non-mating end 53. The ferrule 50 further comprises two precision guide pins 55 held by a guide pin stand off 56. The guide pins 55 protrude from the mating face 52 of the ferrule 50 for proper alignment with a mating ferrule 71 and are held by the guide pin stand off 56 positioned at the non-mating end 53 of the ferrule 50. A mating connector has a complimentary set of guide pin holes that receive the guide pins. Accordingly, as one of ordinary skill in the art appreciates, the guide pin stand off 56 need not actually hold two guide pins. Conceptually, the guide pin stand off can hold one or no guide pins. The actual guide pin configuration depends upon the guide pin configuration of the mating connector, it being important that the guide pin configurations be complementary. A fiber stub (not shown) is terminated in each of the fiber bores 51 of the ferrule 50 and polished to a mating finish at the mating face 52. A length of the fiber stub extends out of the non-mating end of the ferrule 50 and through a fiber access in the guide pin stand off 56. Each length of fiber is positioned in a respective one of the fiber channels 10. Index matching gel is also disposed in the fiber channel 10 in the particular area of the end of the fiber stub. The splice housing 35 and ferrule alignment housing 36 retain the splice assembly 1 and terminated ferrule 50 in proper adjacent positioning with the fiber-receiving bores 51 aligned with the second fiber entrance 13. Assembly of the field terminable duplex fiber optic connector comprises the steps of assembling the splice assembly 1 as previously disclosed. The ferrule 50 is then assembled separately with the guide pins 55 and guide pin stand off 56. Two lengths of fiber stub are prepared and threaded into each one of the two fiber bores 51 and are fixed in place with an epoxy. During curing of the epoxy, a shim is placed between the fiber stubs to splay the fibers centerline spacing from approximately 750 micron spacing in the ferrule to approximately 900 micron spacing in the fiber-receiving element 3. The mating face 52 of the terminated ferrule 50 is then polished. Two full bearing keys 61 are inserted into the bearing channels and rotated to open the fiber channels in the splice assembly. Each remaining length of fiber stub extending from the non-mating end 53 of the ferrule 50 is then inserted into each fiber channel 10 until the guide pin stand off 56 rests against the second end 7 of the fiber-receiving element 3 and splice assembly 1. Index matching gel is deposited in the fiber channel 10 and the full bearing tools 61 are rotated 90 degrees to a closed position. The terminated ferrule 50 and splice assembly 1 are inserted into the ferrule alignment housing 36 and splice housing 35, respectively by positioning the alignment rails 31, 32 into the alignment channel 42,43. The splice housing 35 is then screwed to the ferrule alignment housing 36. The housing 34 is then attached to the connector housing 70. In the disclosed embodiment, the connector housing 70 has an external geometry to permit latchable attachment of the connector housing 70 together with the housing 34, ferrule 50, and splice assembly 1 to a known patch panel or wall mounted outlet, such as the AMP 110 Connect Blocks as shown in FIG. 8 of the drawings. As shown in FIG. 4 of the drawings, the connector housing 70 has an internal geometry that permits latchable attachment of a fiber optic connector using a mating fiber optic array ferrule 71 having a single cantilevered attachment latch. Any mating geometry is possible and is still within the scope of the teachings of the present invention. The ferrule 50 is positioned inside ferrule alignment housing and does not extend all of the way through. There is a recess, therefore, having the same cross section as the periphery of the ferrule 50. The mating ferrule 71 is received by the alignment channel 45 for initial coarse alignment with the ferrule 50. The precision alignment of the ferrules 50,71 is accomplished via the guide pins 55 in the ferrule 50 being received by complementary guide pin holes in the mating ferrule 71.

Figure 11:
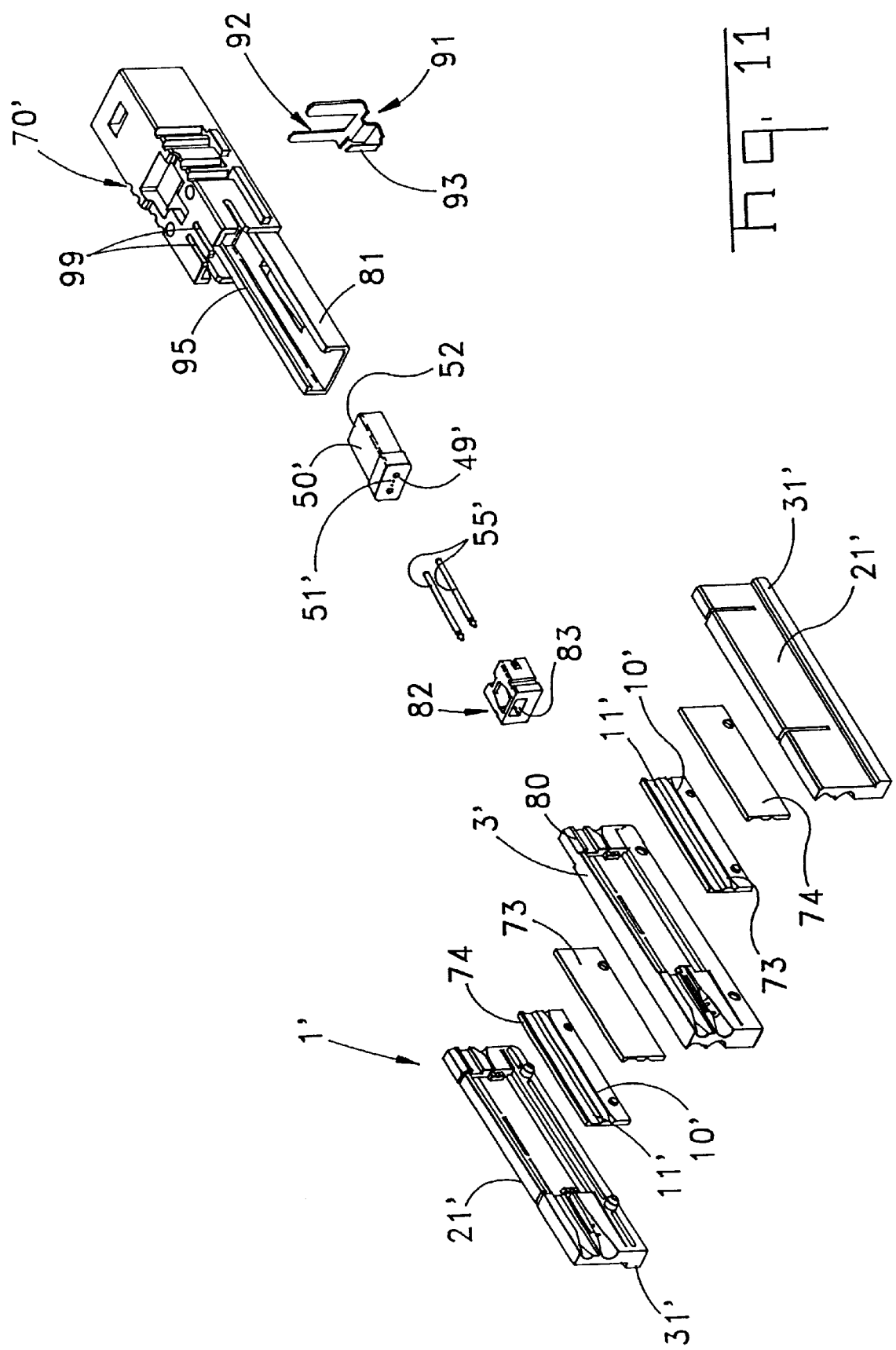
FIG. 11 is a disassembled perspective view of a fiber optic connector and splice according to the teachings of the present invention.
Figure 12:
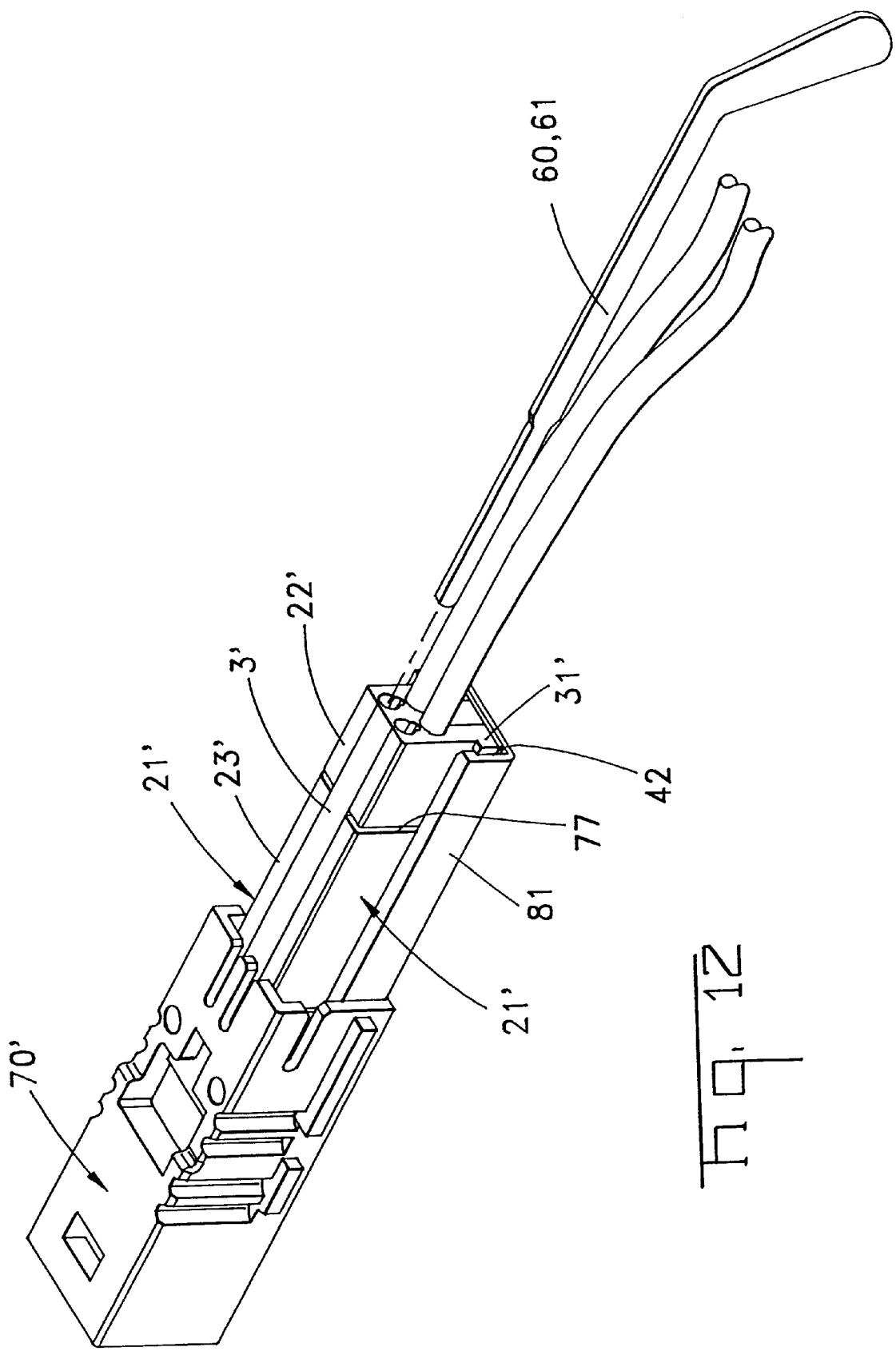
FIG. 12 is an assembled perspective view of the fiber optic connector and splice shown in FIG. 11.

With specific reference to FIGS. 11–13 of the drawings, there is shown an alternate embodiment of the present invention that is particularly well suited to a patch panel environment. The alternate embodiment shown comprises a splice assembly 1' which is similar to the splice disclosed and claimed in U.S. Pat. No. 5,121,456 the contents of which are specifically incorporated by reference herein. The splice disclosed in the '456 patent accommodates splice of a single fiber to another single fiber and has been altered for purposes of the present invention. One alteration is to use the splice as a terminating interface for a connector jack having a pre-polished ferrule. An additional adaptation is to provide for accommodation of at least two independent splices in side by side relation. The alteration includes provision of mirror image geometry on each of two sides of a single polymer body to create a fiber-receiving element 3'. Two polymer body halves (herein referred to as opposite holding plates 21') are structured as mirror images of each other and are disposed against planar faces 5' of the fiber-receiving element 3'. The altered splice for purposes of the present invention includes identical function and structure on its opposite sides. For this reason, the remaining written description of the splice structure is limited to a single side.

An aluminum first clamping element half 73 is disposed against the face 5' of the fiber-receiving element 3'. The first clamping element half 73 is generally planar on one side and includes a fiber channel 10' along its entire longitudinal dimension and a bearing channel 11' also along its longitudinal dimension and spaced apart from and parallel to the fiber channel 10'. The fiber channel 10' further includes a tapered lead-in to facilitate entry of a fiber. The cross sectional geometry of the fiber channel 10' is a V-groove; however, other shapes such as semicircular or semi-rectangular are also appropriate. The cross sectional geometry of the bearing channel 11' is semi-rectangular; however, other non-circular geometries are also appropriate. A second clamping element half 74 is hermaphroditic with the first clamping element half 73 and is, therefore, similar in dimension and structure to the first clamping element half 73 and includes a mirror image of the fiber channel 10' and bearing channel 11' on one of the sides. Alternatively, one of the clamping element halves 73 or 74 may include the fiber and bearing channels 10',11' while the other may be generally planar on both sides. The first and second clamping element halves 73,74 are positioned by bosses 75 and complementary recesses 76. The clamping element halves 73,74 are held together by captivation between the fiber-receiving element 3' and the holding plate 21'. The clamping elements 73,74 rest atop positioning ledges 62 in the fiber-receiving element 3' and holding plate 21'. As one of ordinary skill appreciates, the fiber-receiving element 3' together with the first clamping element half 73 creates a structure similar in concept to the fiber-receiving element 3 as shown in FIGS. 1 and 2 of the drawings. Similarly structured positioning bosses 75 and complementary recesses 76 are also found in the fiber-receiving element 3' and holding plate 21'. The fiber-receiving element 3' and the holding plate 21' are made unitary by ultrasonic welding together along one edge at energy director 63. The remaining three edges are free creating a double cantilever spring structure between the fiber-receiving element 3' and the holding plate 21'. In a first alternate, a single U-shaped spring may be used to position and hold the holding plate 21' biased against the fiber-receiving element 3' to create the double cantilever spring structure. In a second alternative, two U-shaped springs are used over the first portion 22' and third portion 79 respectively, either alone or in addition to the welded edge. As previously indicated the clamping element 73,73 and holding plate 21' structure is repeated on both sides of the fiber-receiving element 3'. The result, therefore, includes two independent double cantilever spring structures for receiving and gripping one or more optical fibers. The fiber channel 10', created by the juxtaposition of the clamping elements 73,74, is sized for receipt and retention of two spliced fibers. The spring force of the cantilever spring structure clamps and retains the spliced fibers without damage to the fibers or compromise of the integrity of the light carrying capability of the fibers. The fiber-receiving element 3' assembled with the clamping elements 73,74 and the holding plate 21' includes the fiber channel 10' appropriately dimensioned to receive and grip a fiber and the bearing channel 11' appropriately dimensioned to receive the bearing tool 60 or 61 on either end of the splice assembly 1'. As the bearing key 60 or 61 is inserted into the bearing channel 11' and rotated, it exerts a separating force between the fiber-receiving element 3' and holding plate 21 as well as the clamping element halves 73,74. The free edges of the splice assembly 1' permit resilient disengagement of the second clamping element half 74 and holding plate 21' from the first clamping element half 73 and fiber-receiving element 3' in response to the separating force in the bearing channel 11' of the clamping element halves 73,74. The amount of the separation of the parts permits free insertion and removal of a fiber within the fiber channel 10' but, does not exceed the elasticity of the holding plate 21 and clamping element 73,74 material. Consequently, upon removal of the separating force by opposite rotation and removal of the bearing key 60 or 61, the holding plate 21 and clamping element halves 73,74 return to their original position relative to the fiber-receiving element 3'. Upon separation of the holding plate 21 from the fiber-receiving element 3' and the simultaneous separation of the clamping element halves 73,74, a fiber may be freely inserted and positioned in the fiber channel 10'. Due to the resiliency of the double cantilever spring structure, the holding plate 21 and clamping element halves 73,74 return to their original positions, clamping the installed fiber. The identical structure on the opposite side of the fiber-receiving element 3' permits independent resilient disengagement and engagement of the holding plate 21' and clamping element 73,74 on both sides of the fiber-receiving element 3' in response to insertion and rotation of another one of the bearing key 60 or 61.

A first relief slot 77 is positioned in the holding plate 21' just adjacent to the clamping element halves 73,74 and isolates a first portion 22' of the holding plate 21' from a second portion 23' of the holding plate 21'. A second relief slot 78 is positioned in the holding plate 21' just adjacent to the clamping elements 73,74 and on a opposite side of the clamping elements 73,74 from the first relief slot 77, and isolates the second portion 23' from a third portion 79. Both the first and second relief slots 77,78 extend transversely through the splice to a position just past the fiber channel 10' leaving enough polymer material in tact so as not to compromise the unitary structure of the splice assembly 1' in its intended use. The first portion 22' is closest to a non-mating end of the splice and is able to receive and clamp either a 900 micron diameter buffered fiber or a 250 micron diameter coated fiber. The central second portion 23' of the splice covers the clamping element halves 73,74. The third portion of the splice 79 is on a ferrule side of the splice. The fiber channel 10' in the clamping element 73,74 is dimensioned to receive and grip the fiber and a short length of fiber termed a fiber stub(not shown). In the disclosed embodiment of the present invention, the fiber to be terminated to the jack is spliced to the fiber stub in the splice assembly 1'. The opposite side of the fiber stub is terminated in ferrule 50'. The third portion 79 has a coating clamping element 40, which is dimensioned to receive and grip the 250 micron diameter coated portion of the fiber stub. In order to effect the splice, opposite ends of the splice are separated to receive the fiber and the fiber stub respectively. Due to the structure of the embodiment, in some instances it is impractical to insert a bearing tool 60 into an axial bearing channel from the side of the splice assembly 1' closest to the ferrule 50'. An edge of the third portion 79 of the fiber-receiving element 3' opposite the ultrasonically welded edge, therefore, includes a wedge lead-in 80. The wedge lead-in 80 facilitates entry of a bearing wedge (not shown) between the fiber-receiving element 3' and the holding plate 21' to impart the separating force on the third portion 79 from a direction perpendicular to the fiber channel 10'. As the wedge is urged between the fiber-receiving element 3' and the holding plate 21', the two pieces separate to permit entry of the fiber stub into the splice assembly 1'. The second relief slot 78 allows the separation of the third portion 79 and second portion 231 to receive the fiber stub without affecting the clamping force of the first portion 22' on the buffered fiber. The splice assembly 1', therefore, independently retains or releases the fiber and fiber stub to be spliced. Further, upon receipt of the fiber in the splice assembly 1', it is desirable for the spring force of the splice in the first portion 22' onto the buffered fiber or the coated fiber be independent of the effect of the grip of the splice onto the fiber in the second portion 23'. When the splice receives the 900 micron diameter buffered fiber, the strength of the retention of the first portion 22' on the buffered fiber acts as a strain relief for the fiber retained in the clamping element 73,74. Accordingly, manufacturing tolerances in the size of the fiber channel 10' in the first portion 21' relative to the buffered fiber diameter cause a variance in the separation between the fiber-receiving element 3' and the holding plate 21'. Similarly, manufacturing tolerances in the size of the fiber channel 10' in the second portion 23' relative to the coated fiber diameter cause a variance in the separation between the fiber-receiving element 3' and the clamping element 73,74 together with the holding plate 21'. Advantageously, the isolation of the first portion 22' from the second portion 23' permits independent clamping retention of the first portion 22' from the second portion 23'. The second relief slot 78 provides similar isolation between the third portion 79 and the second portion 23' of the splice. Coating stop element 41 comprises a block of material having an opening therein that is sized to permit insertion of a 125 micron diameter bare fiber into the fiber channel 10' of the clamping elements 73,74 and to not permit insertion of a 250 micron diameter coated fiber. Accordingly, the coating stop element 41 ensures that only 125 micron diameter bare fiber is received into the fiber channel 10'.

The entire splice assembly 1' is disposed in tub 81 of housing 70' in addition to pin keeper 82, guide pins 55', and ferrule 50'. The ferrule 50', pin keeper 82, and splice assembly 1' are closely adjacent each other within the tub 81. In the disclosed embodiment, the ferrule 50' is a duplex configuration and is terminated with two of the fiber stubs. Each fiber stub has a length of fiber exiting a non-mating end. Each fiber stub is received by a fiber passage 83 in the pin keeper 82. Each fiber stub further extends into the clamping element 73,74 of the splice assembly 1' for splicing with the fiber. Conventional fiber to fiber lateral spacing in the ferrule 50' is constant and measures approximately 0.750 mm. The fiber to fiber lateral spacing as the fibers enter the splice assembly 1' measures 2.280 mm. Accordingly, there is a need for the fibers to transition from a smaller to larger lateral spacing within a fixed distance in a manner so as not to surpass a fiber minimum bend radius. In the disclosed embodiment, the transition occurs within the pin keeper 82.

The pin keeper 82 receives two guide pins 55', which are inserted into guide pin holes in the ferrule 50'. In the disclosed embodiment, the guide pins 55' have substantially the same diameter along most of their length and have a retention area comprising a short length of reduced diameter. The reduced diameter portion creates two retention flanges 57 opposite each other. The pin keeper 82 includes two retention recesses 58 for receipt of the reduced diameter portion of each guide pin 55'. Each retention recess 58 comprises an interference flange 59. The interference flange 59 and front face of the pin keeper 82 interfere with the retention flanges 57 to resist axial travel of the guide pin 55' relative to the pin keeper 82. Centrally disposed between the guide pins 55' and extending the entire length of the pin keeper 82 is at least one fiber passage 83 having a splay guide 84. Conceptually, the fiber passage or passages 83 taper from a first lateral spacing equivalent to the spacing in the ferrule 50' to a second lateral spacing equivalent to the spacing in the splice assembly. The taper of the fiber passage guides the fibers in the transition between the two different lateral spacings without bending the fiber beyond its minimum bend radius. The pin keeper as disclosed herein is manufacturable by conventional polymer injection molding, casting, or compression molding methods.

As with the guide pin stand off as previously described, it is not necessary that the pin keeper 82 hold two guide pins 55. Alternatively, the pin keeper 82 can hold one or no guide pins depending upon the guide pin configuration of the mating connector. The pin keeper 82 without guide pins 55 remains useful, however, in the feature of splaying the fiber ends from the first lateral dimension to the second lateral dimension. The utility of the pin keeper is also retained in that it maintains the distance between the splice assembly 1' and the ferrule 50' that helps accommodate the amount of travel required to splay the fibers without exceeding their minimum bend radius.

In the first specific embodiment as shown in FIGS. 17–21 of the drawings, the fiber passage 83 is a single passage extending through the pin keeper 82. The fiber passage 83 has a first lateral dimension 85 slightly larger than the fiber to fiber spacing of the ferrule 50' on a side positioned closest to the ferrule 50' and a second lateral dimension 86 larger than the fiber to fiber lateral spacing of the splice assembly 1'. The fiber passage 83 tapers to the first lateral dimension 85 from a slightly wider dimension in order to accommodate an epoxy bead that occasionally collects at the non-mating end of the ferrule 50' under practical use. In this way, the ferrule 50' is able to sit flush against the pin keeper 82 for repeatable positioning. The width of the fiber passage 83 gently tapers from the first lateral dimension 85 to the second lateral dimension 86. The splay guide 84 is positioned central to the fiber passage 83, closest to the ferrule 50' and is cylindrical. One side of the pin keeper includes an uncovered area permitting visual access to the splayed fibers. The uncovered area is delimited by two bridges 63 to provide mechanical strength and stability to the unit during guide pin assembly and handling. The pin keeper 82 aids installation of the fiber stub into the splice assembly 1 by receiving the fiber stubs into the fiber passage 83 and on opposite sides of the splay guides 84. The fiber stubs rest tangentially against the splay guide 84, thereby being directed outwardly from each other. The guide pins 55 in the pin keeper 82 are aligned with guide pin holes 49 in the ferrule 50'. As the pin keeper 82 is brought closer to the ferrule 50', the guides pins 55 are further inserted into the guide pin holes and the fiber stubs are urged laterally outwardly by the splay guide 84. Inner walls 87 of the fiber passage 83 define an outer limit of the extent of the splaying of the fiber stubs. In operation, however, the fiber stubs very infrequently reach the outer limit and engage the inner walls 87. Under intended use, the fiber stubs are directed outwardly some distance less than the second lateral dimension 86 and approximately equal to the fiber to fiber spacing of the splice assembly 1'. The fiber stubs so positioned are ready for receipt into the fiber channels 10' of the splice assembly 1'. For purposes of assembly, a side wall 88 of the pin keeper 82 includes two retention channels, each retention channel defining opposite flanges 97 therein.

In the specific embodiment shown in FIGS. 22–24 of the drawings, the fiber passage 83 is a single passage extending through the pin keeper 82. The fiber passage 83 has a first lateral dimension 85 slightly larger than the fiber to fiber spacing of the ferrule 50' on a side positioned closest to the ferrule 50' and a second lateral dimension 86 larger than the fiber to fiber lateral spacing of the splice assembly 1. The width of the fiber passage 83 gently tapers from the first lateral dimension 85 to the second lateral dimension 86. In this embodiment, the splay guide 84 is an elastomeric button that is inserted into the pin keeper after insertion of the fibers. The splay guide 84 is disposed central to the fiber passage 83, closest to the splice assembly 1' and extends approximately halfway through the fiber passage 83. The splay guide 84 is generally cylindrical with two different diameters as shown in FIG. 22 of the drawings. The pin keeper 82 aids installation of the fiber stub into the splice assembly 1 by receiving the fiber pigtails into the fiber passage 83. The splay guide is inserted into the pin keeper allowing the fibers to protrude from the pin keeper on either side of the splay guide 84. Inner walls 87 of the fiber passage 83 define an outer limit of the extent of the splaying of the fiber stubs. Under normal conditions, however, the fiber stubs do not splay so far outwardly that they engage the inner walls 87. As the ferrule 50' is positioned flush against the pin keeper 82, the fiber stubs reach the extent of the splay defined by the splay guide 84. The fiber stubs so positioned are ready for receipt into the fiber channels 10' of the splice assembly 1'. For purposes of assembly, a side wall 88 of the pin keeper 82 includes two retention channels, each retention channel defining opposite flanges 97 therein.

Figure 25:
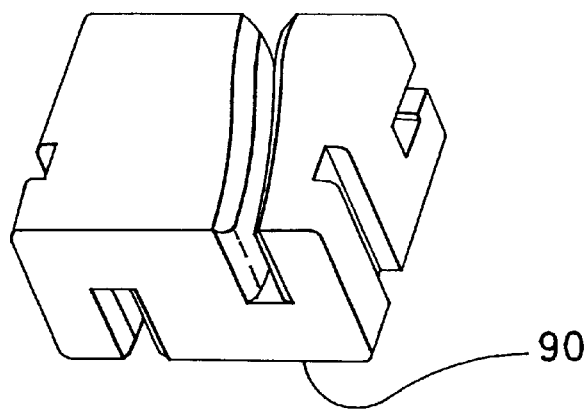
FIGS. 25–27 are perspective views and a cross sectional view of a third embodiment of a pin keeper according to the teachings of the present invention.
Figure 26:
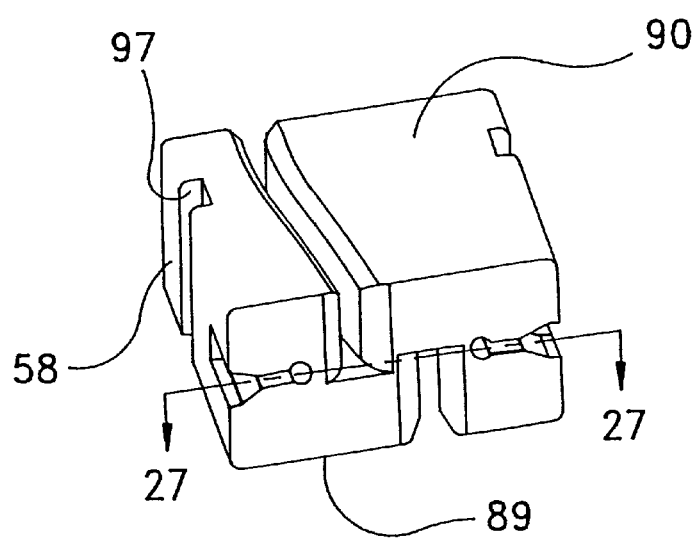
Figure 27:
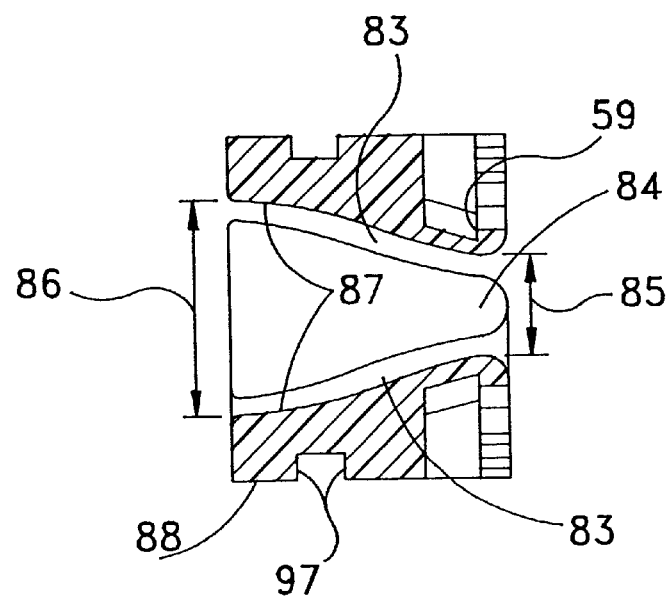

In the specific embodiment shown in FIGS. 25–27 of the drawings, the fiber passage 83 comprises two separate passages extending through the pin keeper 82. One of the fiber passages 83 is accessed on a top side of the pin keeper 82 and another of the fiber passages 83 is accessed on a bottom side of the pin keeper 82. The fiber passages 83 are laterally spaced apart a distance defined by the first lateral dimension 85 closest to the ferrule 50', and is approximately equal to the fiber to fiber spacing of the ferrule 50'. The fiber passages 83 are laterally spaced apart a distance defined by the second lateral dimension 86 closest to the splice assembly 1' and is approximately equal to the fiber to fiber lateral spacing of the splice assembly 1'. The width of each of the fiber passages 83 remain constant and the lateral spacing of the fiber passages 83 tapers from a position consistent with the first lateral dimension 85 to a position consistent with the second lateral dimension 86. The splay guide 84 is positioned between the fiber passages 83, and comprises the portion of the pin keeper 82 between the fiber passages 83 that delineates one passage from the other, thereby extending through the entire length of the pin keeper 82. The pin keeper 82 aids installation of the fiber stub into the splice assembly 1 by full placement of each fiber stub into each fiber passage 83 from a top side 89 and bottom side 90, respectively. This particular embodiment is different from the other embodiments disclosed in that the fiber stubs are initially threaded through the passage, but are inserted from the top and bottom sides 89,90. The guide pins 55 in the pin keeper 82 are aligned with guide pin bores 49' in the ferrule 50'. As the pin keeper 82 is brought closer to the ferrule 50', the guides pins 55 are further inserted into the guide pin bores 49' and the fiber stubs are positioned on opposite sides of the splay guide 84. As the pin keeper 82 is brought closer to the ferrule, the splay guide 84 urges the fiber stubs laterally outwardly. The inner walls 87 of the fiber passage 83 direct the extent of the splaying of the fiber stubs. The fiber stubs so positioned are ready for receipt into the fiber channels 10' of the splice assembly 1'. For purposes of assembly, a side wall 88 of the pin keeper 82 includes two retention channels, each retention channel defining opposite flanges 97 therein.

Assembly of the splice assembly 1' and ferrule 50' to the housing comprises the following steps: the ferrule 50' is terminated with a length of fiber cable (referred to herein as 'the fiber stub') and a ferrule end face 52' is polished. In the illustrated embodiments, the ferrule 50' shown is a duplex array ferrule. Accordingly, the fiber stub is a fiber ribbon comprising two fibers. The fiber stub is cut to length and thermally stripped according to conventional practice. The stripped fiber stub is cleaved, and the terminated ferrule 50' and each fiber in the fiber stub is fully inserted into the pin keeper 82 having the guide pins 55 installed. The pin keeper 82 is positioned flush against the ferrule 50', thereby splaying the fiber stubs to an appropriate dimension for receipt by the splice assembly 1'. Using two short bearing keys 60, inserted and rotated in the bearing channels 11', the second, and third portions 23', and 79 of the splice assembly 1' are separated and each fiber in the fiber stub is inserted into each fiber channel 10'. The fiber stubs are fully inserted into the splice assembly 1', and an end of each fiber stub is positioned within each clamping element 73,74 as the pin keeper 82 is positioned adjacent the splice assembly 1'. The bearing keys 60 are then rotated and removed from the bearing channels 11' to permit the splice assembly 1' to clamp and grip the fiber stubs. The ferrule 50', pin keeper 82, and splice assembly 1' is then slid into position in the tub 81 of the housing 70'. The splice assembly 1' includes an alignment rail 31' comprising an area of increased thickness along an edge of the splice assembly 1'. The tub 81 includes an alignment channel 42 dimensioned for receipt of the alignment rail 31' of the splice assembly 1'. The tub 81 receives ferrule 50, pin keeper 82, and the splice assembly 1' until retention barb 95 releases into retention notch 96. A retaining clip 91 comprising a retention fork 92 unitary with a retention prong 93 is inserted into apertures in the housing 70'. The retention fork 92 is received by the retention channels in the pin keeper 82 and engages the opposite flanges 97 to resist displacement of the pin keeper 82 relative to the tub 81. The retaining prong 93 is received by a retention well 98 in the fiber-receiving element 3'. Accordingly, the retaining clip 91 holds the pin keeper 82 and splice assembly 1' together in juxtaposed relationship and secures the splice assembly 1' and pin keeper 82 to the housing 70. The wedge tool (not shown) may be inserted through wedge windows 99 to engage wedge lead-in 80. Further insertion of the wedge tool into the wedge lead-in operates to release the holding plate 21' from the fiber-receiving element 3'. Simultaneously, a long bearing key 61 is inserted into the splice to release the spring force of the clamping elements 73,74 and allows the fiber stub to align and position itself within the clamping elements 73,74. Once aligned, the wedge tool is removed and the bearing key 61 is rotated and removed. This step of the assembly relieves any bending of the fiber stub at any point between the ferrule 50' and the splice assembly 1' that may have occurred during assembly.

Other advantages of the invention are apparent from the detailed description by way of example and from accompanying drawings and from the spirit and scope of the appended claims.

What is claimed is:
1. A fiber optic apparatus comprising:
   a housing comprising a tub comprising three sides an alignment flange extending from each of two of the sides creating an alignment channel; and
   a splicer disposed in the housing and receiving a plurality of fibers, the splicer comprising at least three walls in parallel alignment, wherein adjacent walls define a slot, each slot containing one of said plurality of fibers, and wherein adjacent walls are independently actuateable to expand the dimension of said slot and facilitates the inserting therein of a fiber for optical coupling with said on of said plurality of fibers, the splicer being disposed in the alignment channel, the splicer further comprising an edge having increases thickness relative to the remainder of the splice creating an alignment rail being received by the alignment channel.

2. A fiber optic apparatus as recited in claim 1, the tub further comprising a retention barb on one side, the edge of the splice further comprising a relieved are a into which the retention barb is received.

3. A fiber optic connector comprising:

a housing having a mating section for interengagement with a mating connector;

a splice element contained in said housing, said splice having at least two substantially parallel walls, said parallel walls defining at least one set of adjacent walls, each set of adjacent walls deforming a slot, each slot containing at least one channel for a fiber, at least one wall of each set of adjacent walls being actuateable such that, when a particular wall of a particular set of adjacent walls is actuated, a fiber is movable within the channel defined by said particular set of adjacent walls, and, when the particular wall is not actuated, said fiber is held in said channel; and a fiber alignment member contained in said housing and adjacent said splice element, said fiber alignment member having a passageway corresponding to each channel and adapted to receive a fiber therein and to present a mating end of said fiber in a predetermined position at said mating section of said housing to facilitate optical coupling with the mating connector.

4. The fiber optic connector of claim 3, wherein said fiber alignment member is a ferrule.

5. The fiber optic connector of claim 3, further comprising at least one fiber, said fiber being disposed in a channel of a slot and having its mating end presented by said fiber alignment member.

6. The fiber optic connector of claim 5, wherein said fiber is a fiber stub and wherein the other end of said fiber stub terminates in said splice element.

7. The fiber optic connector of claim 3, wherein said particular set of adjacent walls are resiliently biased together.

8. The fiber optic connector of claim 7, further comprising a spring to resiliently bias adjacent walls together.

9. The fiber optic connector of claim 8, further comprising a holding block having sides, said sides containing said parallel walls and being biased together such that said parallel walls contained within said holding block are biased together.

10. The fiber optic connector of claim 9, further comprising a spring disposed around a portion of said holding block to bias said sides together.

11. The fiber optic connector of claim 6, wherein said housing retains a fiber optic device that is in communication with said stub.

12. The fiber optic connector of claim 3, further comprising a plurality of fiber stubs, each stub being disposed in a channel of a slot and having its mating end presented by said fiber alignment member and its other end disposed in a channel, and a pin keeper disposed between said splicer and said fiber alignment member and through which said stubs pass.

13. The fiber optic connector of claim 12, wherein said pin keeper splays at least two of said stubs from a first lateral dimension to a second lateral dimension.

14. The fiber optic connector of claim 3, further comprising a pin keeper and a retaining clip, wherein said retaining clip engages the housing, the pin keeper, and the splice element to maintain relative positioning of the splice element, the housing, and the pin keeper.

15. The fiber optic connector of claim 14, wherein the housing further comprises a tub on which the splicer is disposed, the tub comprising three sides, an alignment flange extending from each of two of the sides creating an alignment channel, the splicer further comprising an edge having increased thickness relative to the remainder of the splice creating an alignment rail, the alignment rail being received by the alignment channel.

* * * * *